United States Patent
Huang

(10) Patent No.: US 9,140,930 B2
(45) Date of Patent: Sep. 22, 2015

(54) SLIM FRAME BACKLIGHT MODULE

(75) Inventor: Jianfa Huang, Guangdong (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 0 days.

(21) Appl. No.: 13/520,569

(22) PCT Filed: Apr. 12, 2012

(86) PCT No.: PCT/CN2012/073919
§ 371 (c)(1),
(2), (4) Date: Jul. 4, 2012

(87) PCT Pub. No.: WO2013/149412
PCT Pub. Date: Oct. 10, 2013

(65) Prior Publication Data
US 2013/0258710 A1    Oct. 3, 2013

(30) Foreign Application Priority Data
Apr. 1, 2012  (CN) .......................... 2012 1 0096103

(51) Int. Cl.
*F21V 7/04*  (2006.01)
*G02F 1/1335*  (2006.01)
*G02F 1/1333*  (2006.01)
*F21V 8/00*  (2006.01)

(52) U.S. Cl.
CPC ........ *G02F 1/133608* (2013.01); *G02B 6/0031* (2013.01); *G02B 6/0045* (2013.01); *G02F 1/133382* (2013.01)

(58) Field of Classification Search
CPC .. G02B 6/0033; G02B 6/0068; G02B 6/0031; G02B 6/002
USPC .................................. 362/606–610, 615, 621
See application file for complete search history.

(56) References Cited

U.S. PATENT DOCUMENTS

| | | | | |
|---|---|---|---|---|
| 6,779,902 B2 * | 8/2004 | Cha et al. | ...................... | 362/600 |
| 7,293,906 B2 * | 11/2007 | Mok et al. | ..................... | 362/609 |
| 7,364,343 B2 * | 4/2008 | Keuper et al. | ................. | 362/628 |
| 7,513,669 B2 * | 4/2009 | Chua et al. | .................... | 362/606 |
| 7,538,340 B2 * | 5/2009 | Pang et al. | ...................... | 257/21 |
| 7,600,908 B2 * | 10/2009 | Chang et al. | .................. | 362/623 |
| 7,690,831 B2 * | 4/2010 | Mori et al. | .................... | 362/621 |
| 7,859,731 B2 * | 12/2010 | Choi | .............................. | 359/34 |

(Continued)

FOREIGN PATENT DOCUMENTS

CN        1936627 A        3/2007

*Primary Examiner* — Robert May
*Assistant Examiner* — Bryon T Gyllstrom
(74) *Attorney, Agent, or Firm* — Cheng-Ju Chiang

(57) ABSTRACT

The present invention provides a slim frame backlight module, which includes a backplane, a backlight source arranged inside the backplane, a side reflector plate arranged inside the backplane, and a light guide plate arranged inside the backplane. The light guide plate includes a bottom surface, a top surface opposite to the bottom surface, and at least one light incident surface connecting between the bottom surface and the top surface. The light incident surface is set inwardly inclined with respect to the top surface, so that the light incident surface and the top surface form therebetween an included angle less than 90°. Light emitting from the backlight source can be reflected by the side reflector plate to the light incident surface or is directly projected to the light incident surface to transmit through the light incident surface into the light guide plate.

9 Claims, 2 Drawing Sheets

(56) References Cited

U.S. PATENT DOCUMENTS

| | | | |
|---|---|---|---|
| 8,070,346 B2 * | 12/2011 | Maeda et al. | 362/627 |
| 8,517,592 B2 * | 8/2013 | Shimizu | 362/621 |
| 2002/0080596 A1 | 6/2002 | Fukiharu | |
| 2006/0262554 A1 * | 11/2006 | Mok et al. | 362/555 |
| 2010/0172152 A1 * | 7/2010 | Boonekamp | 362/609 |

* cited by examiner

SLIM FRAME BACKLIGHT MODULE

BACKGROUND OF THE INVENTION

1. Field of the Invention

The present invention relates to the field of liquid crystal displaying, and in particular to a slim frame backlight module.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source, such as an LED light bar based light source, at an edge of a back panel that is located rearward of one side of the liquid crystal panel. The LED light bar emits light that enters a light guide plate through a light incident face of the light guide plate and is projected out through a light exit face after being reflected and diffused to thereby form, after transmitting through a set of optic films, a planar light source to be provided to the liquid crystal panel.

With the development and popularity of liquid crystal display devices, it is increasingly demanded in the market that the thickness of the liquid crystal display panel is made thin and outer frame of the liquid crystal panel made slim. As shown in FIG. 1, a conventional bottom-incidence side-edge backlight module comprises a backplane 100, a bottom reflector plate 200 arranged inside the backplane 100, a light guide plate 300 disposed on the bottom reflector plate 200, a backlight source 400 arranged inside the backplane 100, and a side reflector plate 500 arranged above the backlight source 400. The side reflector plate 500 comprises an inclined reflection surface 502. The backlight source 400 is arranged below the reflection surface 502. The light guide plate 300 comprises a top surface 302, a bottom surface 304, and a plurality o side surfaces perpendicular to the top surface and the bottom surface. One of the side surfaces forms a light incident surface 306. The backlight source 400 emits light that is reflected by the reflection surface 502 toward the light incident surface 306, and then enters the light guide plate 300. Such a structure of backlight module provides an improved effect of frame slimming and a frame that is as slim as 4.3 mm can be realized. However, such a structure of backlight module has all the light reflected by the reflection surface 502 of the side reflector plate 500 before it enters the light guide plate 300. This, to some extents, limits the slimming of the backlight module.

SUMMARY OF THE INVENTION

Thus, an object of the present invention is to provide a slim frame backlight module that has a simple structure and helps further slimming of frame of backlight module.

To achieve the object, the present invention provides slim frame backlight module, which comprises a backplane, a backlight source arranged inside the backplane, a side reflector plate arranged inside the backplane, and a light guide plate arranged inside the backplane. The light guide plate comprises a bottom surface, a top surface opposite to the bottom surface, and side surfaces connecting between the bottom surface and the top surface. The side surfaces comprise at least one light incident surface. The light incident surface is set inwardly inclined with respect to the top surface so that the light incident surface and the top surface form therebetween an included angle less than 90°. Light emitting from the backlight source is reflected by the side reflector plate to the light incident surface or is directly projected to the light incident surface to transmit through the light incident surface into the light guide plate.

The n the included angle between the light incident surface and the top surface is determined by the following formula: $\theta = 2 \times \arcsin(1/n)$, and $d = T \times \sin(90° - \theta)$, where T is the thickness of the light guide plate; d is the amount of dimension reduction of the bottom surface of the light guide plate with respect to the top surface at the side where the light incident surface is located; n is the refractive index of the light guide plate; and $\theta$ is the included angle between the light incident surface and the top surface of the light guide plate.

When the refractive index n of the light guide plate is 1.45 and the thickness T of the light guide plate is 3 mm, the included angle $\theta$ between the light incident surface and the top surface is 83.6° and the amount of dimension reduction d of the bottom surface of the light guide plate with respect to the top surface at the side of the light incident surface is 0.33.

When the refractive index n of the light guide plate is 1.5 and the thickness T of the light guide plate is 4 mm, the included angle $\theta$ between the light incident surface and the top surface is 77.4° and the amount of dimension reduction d of the bottom surface of the light guide plate with respect to the top surface at the side of the light incident surface is 0.89.

The backplane comprises a bottom plate and a side plate connected to the bottom plate. The light guide plate is disposed on the bottom plate in such a way that the light incident surface of the light guide plate, the side plate opposing the light incident surface, and the bottom plate collectively defining a receiving space. The backlight source is arranged in the receiving space and fixedly mounted to the bottom plate. The side reflector plate is arranged inside the receiving space and mounted to the side plate.

A bottom reflector plate is further included and arranged between the light guide plate and the bottom plate.

The side reflector plate comprises a reflection surface. The backlight source is arranged between the reflection surface of the side reflector plate and the light incident surface of the light guide plate.

The backlight source is arranged below the reflection surface of the side reflector plate and the light incident surface of the light guide plate.

The backlight source comprises a linear LED light bar.

The efficacy of the present invention is that the present invention provides a slim frame backlight module, which arranges the light incident surface of the light guide plate in an inclined manner and also arranges a backlight source below but in between the light incident surface of the light guide plate and the reflection surface of the side reflector plate in order to allow light emitting from the backlight source to be reflected by the side reflector plate toward the light incident surface or to be directly projected onto the light incident surface to transmit through the light incident surface into the light guide plate, thereby realizing further slimming of the frame of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
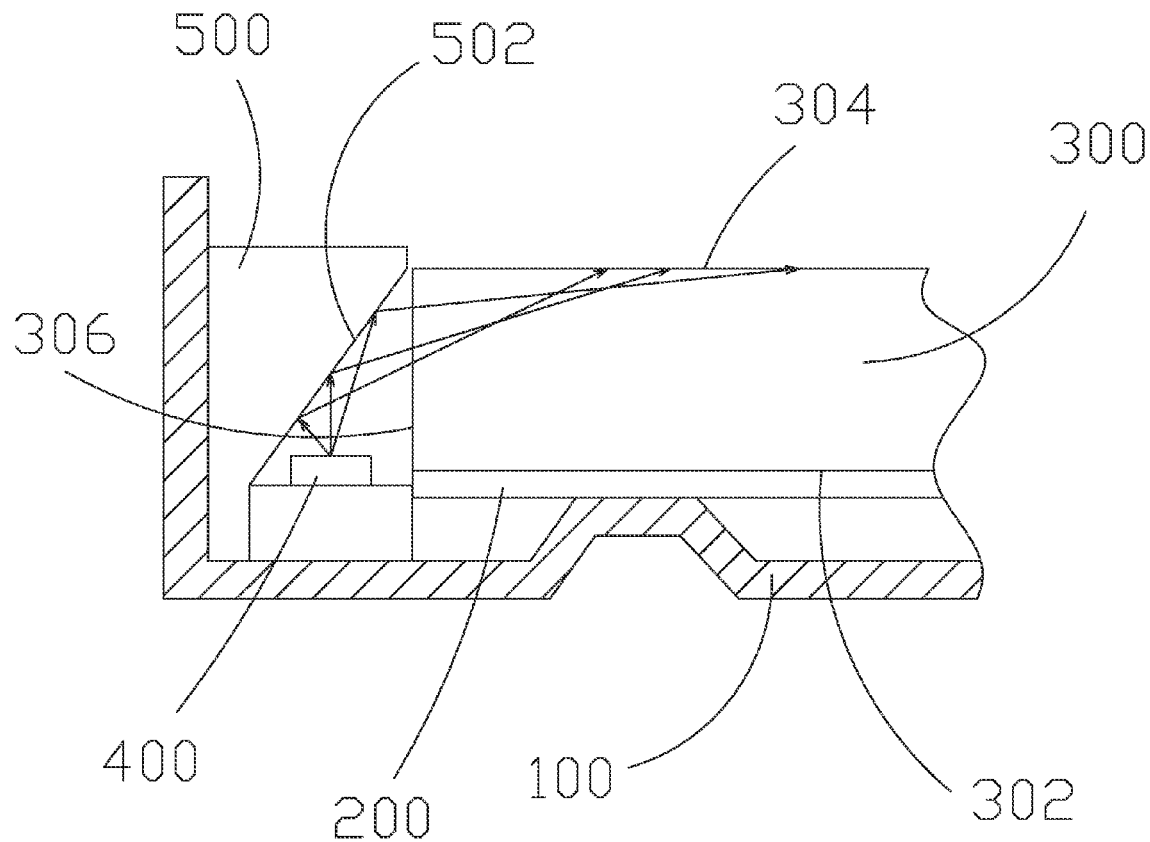
FIG. 1 is a schematic view showing the structure of a known backlight module.
Figure 2:
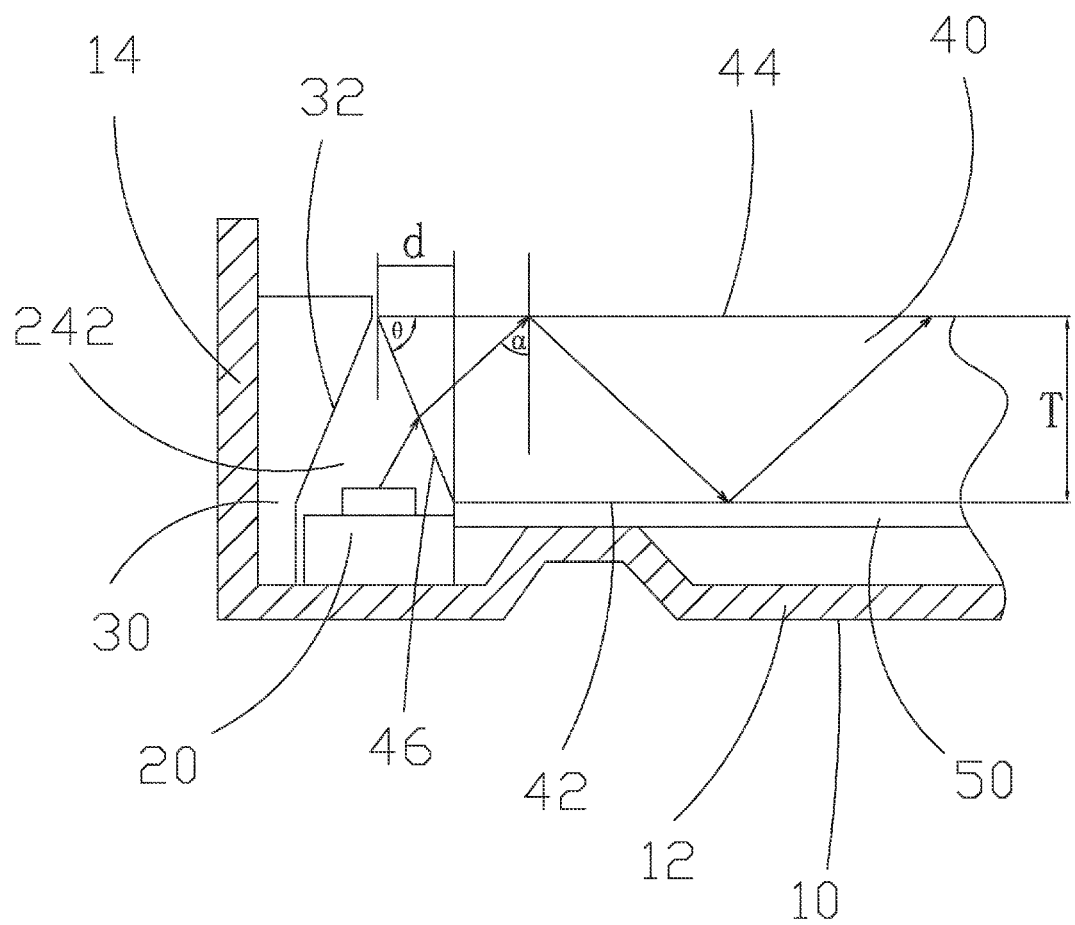
FIG. 2 is a schematic view showing the structure of a slim bezel backlight module according to the present invention.

Referring to FIG. 2, the present invention provides a slim frame backlight module, which comprises a backplane 10, a backlight source 20 arranged inside the backplane 10, a side reflector plate 30 arranged inside the backplane 10, and a light guide plate 40 arranged inside the backplane 10.

The light guide plate 40 comprises a bottom surface 42, a top surface 44 opposite to the bottom surface 42, and a plurality of side surface connected between the bottom surface 42 and the top surface 44. The plurality of side surfaces comprise a light incident surface 46, and the light incident surface 46 is inwardly inclined with respect to the top surface 44, so that the light incident surface 46 and the top surface 44 form therebetween an included angle less than 90°. The light emitting from the backlight source 20 is reflected by the side reflector plate 30 to the light incident surface 46 or is directly projected to the light incident surface 46, and then transmits through the light incident surface 46 into the light guide plate 40.

The included angle between the light incident surface 46 and the top surface 44 is determined by the following formula: $\theta = 2 \times \arcsin(1/n)$, and $d = T \times \sin(90° - \theta)$, where T is the thickness of the light guide plate 40; d is the amount of dimension reduction of the bottom surface 42 of the light guide plate 40 with respect to the top surface 44 at the side where the light incident surface 46 is located; n is the refractive index of the light guide plate 40; and $\theta$ is the included angle between the light incident surface 46 and the top surface 44 of the light guide plate 40. Then, the total reflection angle for total reflection of light at the top surface 44 of the light guide plate 40 is $\alpha = \arcsin(1/n)$. To make light that enters the light guide plate 40 not to emit outward from the light incident surface 46, the light inside the light guide plate 40 must show a critical value of the included angle thereof with respect to the normal of the light incident surface 46 to be the total reflection angle $\alpha$. The geometrical relationship gives that the included angle $\theta$ between the light incident surface 46 and the top surface 44 of the light guide plate 40 is $\theta = 2 \times \alpha$, namely $\theta = 2 \times \arcsin(1/n)$. Further, the amount of dimension reduction of the bottom surface 42 of the light guide plate 40 with respect to the top surface 44 is $d = T \times \tan(90° - \theta)$, and since this angle $(90° - \theta)$ is small, it may make a rough conclusion that $\tan(90° - \theta) \approx \sin(90° - \theta)$, namely $d = T \times \sin(90° - \theta)$.

Description regarding to the above formula will now be made with a regular the light guide plate being taken as an example.

For a first example, considering the refractive index n of the light guide plate 40 is 1.5, the thickness T of the light guide plate 40 is 4 mm, then the included angle $\theta$ between the light incident surface 46 and the top surface 46 is 77.4° and the amount of dimension reduction d of the bottom surface 42 of the light guide plate 40 with respect to the top surface 44 at the side of the light incident surface 46 is 0.89 mm.

For a second example, considering the refractive index n of the light guide plate 40 is 1.5, the thickness T of the light guide plate 40 is 4 mm, then the included angle $\theta$ between the light incident surface 46 and the top surface 46 is 77.4° and the amount of dimension reduction d of the bottom surface 42 of the light guide plate 40 with respect to the top surface 44 at the side of the light incident surface 46 is 0.89 mm.

The above examples show that the present invention realizes improved frame slimming of the backlight module over the known techniques. The amount of slimming is of close relationship with the refractive index n and thickness T of the light guide plate. A light guide plate having a great refractive index n is more effective in realizing a great amount of frame width reduction and increasing the thickness T of the light guide plate provides the same effect of reducing frame width to realize a slim frame design.

The backplane 10 comprises a bottom plate 12 and a side plate 14 connected to the bottom plate 12. The light guide plate 40 is disposed on the bottom plate 12 in such a way that the light incident surface 46 of the light guide plate 40, the side plate 14 opposing the light incident surface, and the bottom plate 12 collectively define a receiving space 242. The backlight source 20 is arranged in the receiving space 242 and is fixedly mounted to the bottom plate 12. The side reflector plate 30 is arranged inside the receiving space 242 and is mounted to the side plate 14.

The side reflector plate 30 comprises a reflection surface 32, and the backlight source 20 is located between the reflection surface 32 of the side reflector plate 30 and the light incident surface 46 of the light guide plate 40. Preferably, the backlight source 20 is located below the reflection surface 32 of the side reflector plate 30 and the light incident surface 46 of the light guide plate 40.

The backlight module further comprises a bottom reflector plate 50 arranged between the light guide plate 40 and the bottom plate 12.

The backlight source 20 can be a linear LED light bar.

In summary, the present invention provides a slim frame backlight module, which arranges the light incident surface of the light guide plate in an inclined manner and also arranges a backlight source below but in between the light incident surface of the light guide plate and the reflection surface of the side reflector plate in order to allow light emitting from the backlight source to be reflected by the side reflector plate toward the light incident surface or to be directly projected onto the light incident surface to transmit through the light incident surface into the light guide plate, thereby realizing further slimming of the frame of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A slim frame backlight module, comprising a backplane, a backlight source arranged inside the backplane, a side reflector plate arranged inside the backplane, and a light guide plate arranged inside the backplane, the light guide plate comprising a bottom surface, a top surface opposite to the bottom surface, and side surfaces connecting between the bottom surface and the top surface, the side surfaces comprising at least one light incident surface, the light incident surface being a planar surface set inwardly inclined with respect to the top surface, so that the light incident surface and the top surface form therebetween an included angle less than 90°, light emitting from the backlight source being reflected by the side reflector plate to the light incident surface or being directly projected to the light incident surface to be refracted by the light incident surface into the light guide plate;

wherein the side reflector plate comprises a reflection surface that is planar and uncurved across entire span of the reflection surface, the reflection surface of the side reflector plate being inclined so that the inclined reflection surface of the side reflector plate and the inclined light incident surface of the light guide plate collectively define an included angle therebetween, the backlight source being arranged between and below the reflection surface of the side reflector plate and the light incident surface of the light guide plate and beneath the included angle; and wherein the backlight source is arranged below the reflection surface of the side reflector plate and the light incident surface of the light guide plate in such a way that the backlight source is at least partly located under the top surface of the light guide plate and a portion of light emitting from the backlight source directly transmits through the light incident surface of the light guide plate and a remaining portion of the light emitting from the backlight source is reflected by the reflection surface of the side reflector plate toward the light incident surface of the light guide plate.

2. The slim frame backlight module as claimed in claim 1, wherein the included angle between the light incident surface and the top surface is determined by the following formula: $\theta=2\times\arcsin(1/n)$, and $d=T\times\sin(90°-\theta)$, where T is the thickness of the light guide plate; d is the amount of dimension reduction of the bottom surface of the light guide plate with respect to the top surface at the side where the light incident surface is located; n is the refractive index of the light guide plate; and $\theta$ is the included angle between the light incident surface and the top surface of the light guide plate.

3. The slim frame backlight module as claimed in claim 2, wherein the refractive index n of the light guide plate is 1.45, the thickness T of the light guide plate is 3mm, so that the included angle $\theta$ between the light incident surface and the top surface is 83.6° and the amount of dimension reduction d of the bottom surface of the light guide plate with respect to the top surface at the side of the light incident surface is 0.33.

4. The slim frame backlight module as claimed in claim 2, wherein the refractive index n of the light guide plate is 1.5, the thickness T of the light guide plate is 4mm, so that the included angle $\theta$ between the light incident surface and the top surface is 77.4° and the amount of dimension reduction d of the bottom surface of the light guide plate with respect to the top surface at the side of the light incident surface is 0.89.

5. The slim frame backlight module as claimed in claim 1, wherein the backplane comprises a bottom plate and a side plate connected to the bottom plate, the light guide plate being disposed on the bottom plate in such a way that the light incident surface of the light guide plate, the side plate opposing the light incident surface, and the bottom plate collectively defining a receiving space, the backlight source being arranged in the receiving space and fixedly mounted to the bottom plate, the side reflector plate being arranged inside the receiving space and mounted to the side plate.

6. The slim frame backlight module as claimed in claim 5, further comprising a bottom reflector plate arranged between the light guide plate and the bottom plate.

7. The slim frame backlight module as claimed in claim 1, wherein the backlight source comprises a linear light emitting diode (LED) light bar.

8. A slim frame backlight module, comprising a backplane, a backlight source arranged inside the backplane, a side reflector plate arranged inside the backplane, and a light guide plate arranged inside the backplane, the light guide plate comprising a bottom surface, a top surface opposite to the bottom surface, and side surfaces connecting between the bottom surface and the top surface, the side surfaces comprising at least one light incident surface, the light incident surface being a planar surface set inwardly inclined with respect to the top surface, so that the light incident surface and the top surface form therebetween an included angle less than 90°, light emitting from the backlight source being reflected by the side reflector plate to the light incident surface or being directly projected to the light incident surface to be refracted by the light incident surface into the light guide plate;

wherein the included angle between the light incident surface and the top surface is determined by the following formula: $\theta=2\times\arcsin(1/n)$, and $d=T\times\sin(90°-\theta)$, where T is the thickness of the light guide plate; d is the amount of dimension reduction of the bottom surface of the light guide plate with respect to the top surface at the side where the light incident surface is located; n is the refractive index of the light guide plate; and $\theta$ is the included angle between the light incident surface and the top surface of the light guide plate;

wherein the backplane comprises a bottom plate and a side plate connected to the bottom plate, the light guide plate being disposed on the bottom plate in such a way that the light incident surface of the light guide plate, the side plate opposing the light incident surface, and the bottom plate collectively defining a receiving space, the backlight source being arranged in the receiving space and fixedly mounted to the bottom plate, the side reflector plate being arranged inside the receiving space and mounted to the side plate;

wherein a bottom reflector plate is arranged between the light guide plate and the bottom plate;

wherein the side reflector plate comprises a reflection surface that is planar and uncurved across entire span of the reflection surface, the backlight source being arranged between the reflection surface of the side reflector plate and the light incident surface of the light guide plate;

wherein the backlight source is arranged below the reflection surface of the side reflector plate and the light incident surface of the light guide plate in such a way that the backlight source is at least partly located under the top surface of the light guide plate and a portion of light emitting from the backlight source directly transmits through the light incident surface of the light guide plate and a remaining portion of the light emitting from the backlight source is reflected by the reflection surface of the side reflector plate toward the light incident surface of the light guide plate; and wherein the backlight source comprises a linear light emitting diode (LED) light bar.

9. A slim frame backlight module, comprising:
a backplane;
a side reflector plate arranged inside the backplane and comprising a reflection surface that is planar and uncurved across entire span of the reflection surface;
a light guide plate arranged inside the backplane and comprising a bottom surface, a top surface opposite to the bottom surface, and side surfaces connecting between the bottom surface and the top surface, the side surfaces comprising a planar light incident surface opposing the reflection surface of the side reflector plate and set inwardly inclined with respect to the top surface so that the light incident surface and the top surface form therebetween an included angle $\theta$ that is determined by the following formula: $\theta=2\times\arcsin(1/n)$, and $d=T\times\sin(90°-\theta)$, where T is the thickness of the light guide plate; d is the amount of dimension reduction of the bottom surface of the light guide plate with respect to the top surface at the side where the light incident surface is located; and n is the refractive index of the light guide plate, wherein the reflection surface of the side reflector plate that is made inclined so as to define an included angle with the inclined light incident surface of the light guide plate; and a backlight source arranged inside the backplane and located between and below the reflection surface of the side reflector plate and the light incident surface of the light guide plate and beneath the included angle between the reflection surface of the side reflector plate and the light incident surface of the light guide plate in such a way that the backlight source is at least partly located under the top surface of the light guide plate, whereby light emitting from the backlight source is partly reflected by the reflection surface of the side reflector plate toward the light incident surface and partly projected directly to the light incident surface to be refracted and enter the light guide plate.

* * * * *